United States Patent
Hioki

(10) Patent No.: US 12,391,054 B2
(45) Date of Patent: Aug. 19, 2025

(54) TREATMENT LIQUID FOR INK-JET PRINTING, INK-JET TEXTILE PRINTING DEVICE, AND INK-JET TEXTILE PRINTING METHOD

(71) Applicant: KYOCERA Document Solutions Inc., Osaka (JP)

(72) Inventor: Jun Hioki, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 292 days.

(21) Appl. No.: 17/623,365

(22) PCT Filed: Mar. 5, 2021

(86) PCT No.: PCT/JP2021/008760
§ 371 (c)(1),
(2) Date: Jun. 19, 2023

(87) PCT Pub. No.: WO2021/182338
PCT Pub. Date: Sep. 16, 2021

(65) Prior Publication Data
US 2023/0323148 A1    Oct. 12, 2023

(30) Foreign Application Priority Data
Mar. 10, 2020  (JP) ................. 2020-040980

(51) Int. Cl.
*B41J 3/407*  (2006.01)
*B41J 2/14*    (2006.01)
(Continued)

(52) U.S. Cl.
CPC ......... *B41J 3/4078* (2013.01); *B41J 2/14024* (2013.01); *B41M 5/0011* (2013.01);
(Continued)

(58) Field of Classification Search
CPC ... B41J 3/4078; B41J 2/14024; C09D 11/023; C09D 11/102; C09D 11/40; C09D 11/54; B41M 5/0011
See application file for complete search history.

(56) References Cited

U.S. PATENT DOCUMENTS

| | | | |
|---|---|---|---|
| 11,667,801 B2 | 6/2023 | Yamada | |
| 2004/0138337 A1* | 7/2004 | Hasegawa | ............. C09D 11/40 106/31.86 |

(Continued)

FOREIGN PATENT DOCUMENTS

| | | |
|---|---|---|
| CN | 103614910 | 3/2014 |
| JP | H10-237776 | 9/1998 |

(Continued)

OTHER PUBLICATIONS

JPO, Office Action of JP 2022-507146 dated Jan. 31, 2023, total 10 pages.
(Continued)

*Primary Examiner* — Jason S Uhlenhake
(74) *Attorney, Agent, or Firm* — LEX IP MEISTER, PLLC

(57) ABSTRACT

An ink-jet treatment liquid includes: an emulsified particle containing a silicone oil; and an aqueous medium. The silicone oil contains at least an ionic group-containing silicone oil, and content rate of the silicone oil in the ink-jet treatment liquid is 5% by mass or more and 15% by mass or less. Viscosity of the silicone oil is 1,000 mm$^2$/s or more.

10 Claims, 1 Drawing Sheet

(51) Int. Cl.
*B41M 5/00* (2006.01)
*C09D 11/02* (2014.01)
*C09D 11/023* (2014.01)
*C09D 11/102* (2014.01)
*C09D 11/40* (2014.01)
*C09D 11/54* (2014.01)
*D06P 1/52* (2006.01)
*D06P 5/00* (2006.01)
*D06P 5/08* (2006.01)
*D06P 5/30* (2006.01)

(52) U.S. Cl.
CPC .......... *C09D 11/023* (2013.01); *C09D 11/102* (2013.01); *C09D 11/40* (2013.01); *C09D 11/54* (2013.01); *D06P 1/5292* (2013.01); *D06P 5/001* (2013.01); *D06P 5/08* (2013.01); *D06P 5/30* (2013.01)

(56) References Cited

U.S. PATENT DOCUMENTS

| | | | |
|---|---|---|---|
| 2010/0273929 | A1 | 10/2010 | Kitagawa et al. |
| 2015/0145939 | A1* | 5/2015 | Yabe ................ B41J 17/02 347/213 |
| 2015/0166819 | A1* | 6/2015 | Shinohara ............ C09D 11/40 347/21 |

FOREIGN PATENT DOCUMENTS

| | | |
|---|---|---|
| JP | 2000-290884 | 10/2000 |
| JP | 2006-124855 | 5/2006 |
| JP | 2009-150010 | 7/2009 |
| JP | 2013-075524 | 4/2013 |
| JP | 2018-035273 | 3/2018 |
| JP | 2019-99790 | 6/2019 |
| JP | 2020-105304 | 7/2020 |

OTHER PUBLICATIONS

JPO, Office Action of JP 2023-040882 dated May 16, 2023, total 12 pages.

* cited by examiner

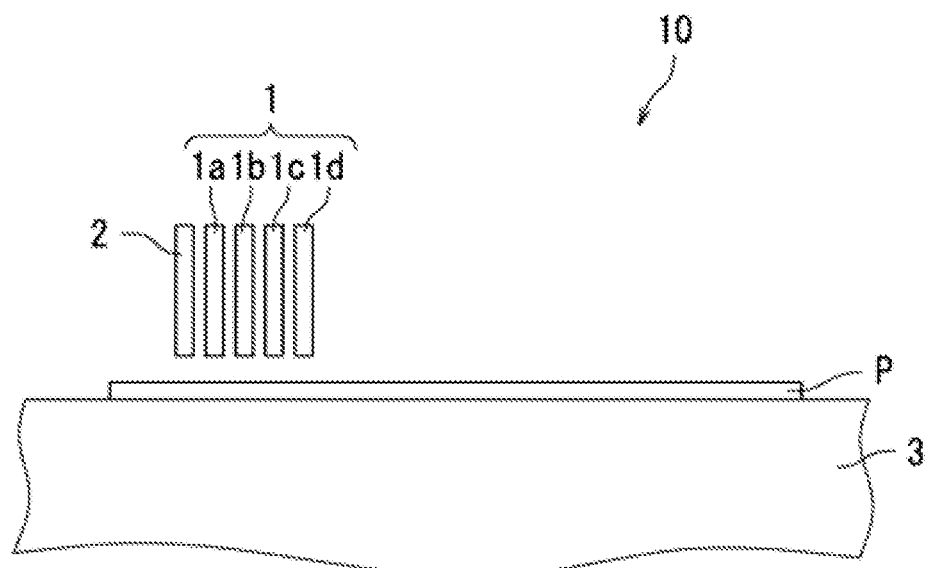

TREATMENT LIQUID FOR INK-JET PRINTING, INK-JET TEXTILE PRINTING DEVICE, AND INK-JET TEXTILE PRINTING METHOD

TECHNICAL FIELD

The present invention relates to an ink-jet treatment liquid, an ink-jet textile printing apparatus, and an ink-jet textile printing method.

BACKGROUND ART

In an ink-jet textile printing method, for example, an ink containing a pigment is used. Pigment-containing inks may be used in combination with post-treatment liquids to improve the frictional fastness of the textile print object on which the image is formed (hereinafter, as the case may be, referred to as textile printed matter).

On the other hand, a transport roller for an ink-jet recording apparatus is conventionally known (please refer to Patent Document 1, for example). In order to suppress adhesion of ink to the surface of the transport roller, a treatment liquid containing one or both of fullerenes and fullerene derivatives is applied to the surface of the transport roller. The dispersion medium of this treatment liquid may be silicone oil.

CITATION LIST

Patent Literature

Japanese Unexamined Patent Application Publication No. 2013-75524

SUMMARY OF THE INVENTION

Problems to be Solved by the Invention

However, the treatment liquid to be applied to the transport roller as described in Patent Document 1 suppresses adhesion of ink. Therefore, it is difficult to improve the frictional fastness of the textile printed matter by applying this treatment liquid to the ink for the textile printed matter.

The present invention has been made in view of the above-stated problems, and an objective thereof is to provide an ink-jet treatment liquid that can be discharged from the treatment head of the ink-jet textile printing apparatus, and that can form a textile printed matter having excellent frictional fastness and suppress deterioration of the tactile sensation of the textile printed matter. Another objective of the present invention is to provide an ink-jet textile printing apparatus and an ink-jet textile printing method that can form a textile printed matter having excellent frictional fastness and suppress deterioration of the tactile sensation of the textile printed matter.

MEANS FOR SOLVING THE PROBLEM

An ink-jet treatment liquid according to the present invention includes an emulsified particle containing a silicone oil; and an aqueous medium. Content rate of the silicone oil in the ink-jet treatment liquid is 5% by mass or more and 15% by mass or less. The silicone oil contains at least an ionic group-containing silicone oil.

An ink-jet textile printing apparatus according to the present invention includes a record head that discharges an ink to an image formation area of a textile print object; and a treatment head that discharges a treatment liquid to at least the image formation area of the textile print object. The treatment liquid is the ink-jet treatment liquid already described.

An ink-jet textile printing method according to the present invention includes an ink discharging process that discharges an ink from a record head to an image formation area of a textile print object; and a treating process that discharges a treatment liquid from a treatment head to at least the image formation area of the textile print object. The treatment liquid is the ink-jet treatment liquid already described.

Effect of the Invention

The treatment liquid according to the present invention can be discharged from the treatment head of the ink-jet textile printing apparatus, and can form a textile printed matter having excellent frictional fastness and suppress deterioration of the tactile sensation of the printed matter. Moreover, the ink-jet textile printing apparatus and the ink-jet textile printing method according to the present invention can form a textile printed matter having excellent frictional fastness and suppress deterioration of the tactile sensation of the textile printed matter.

BRIEF DESCRIPTION OF THE DRAWINGS

FIG. 1 is a side view showing an example of an ink-jet textile printing apparatus according to a second embodiment of the present invention.

MODE FOR CARRYING OUT THE INVENTION

The following describes embodiments of the present invention. In this specification, the measured value of the volume median diameter ($D_{50}$) is the median diameter measured by a laser diffraction/scattering type particle size distribution measuring apparatus ("LA-950" made by HORIBA, Ltd.), unless otherwise specified. Hereinafter, the volume median diameter may be referred to as "$D_{50}$". Unless otherwise specified, the "main component" of a material means the component most abundantly contained in the material on a mass basis. "Specific gravity" means the specific gravity at 25° C., unless otherwise specified. Acrylics and methacryls may be collectively referred to as "(meth-a)acrylics". Each component described in the present specification may be used alone or in combination of two or more.

First Embodiment: Ink-Jet Treatment Liquid

Hereinafter, an ink-jet treatment liquid (hereinafter, may be referred to as treatment liquid) according to a first embodiment of the present invention will be described. The treatment liquid according to the first embodiment contains emulsified particles and an aqueous medium. Emulsified particles are dispersed in the aqueous medium of the treatment liquid. That is, the treatment liquid according to the first embodiment is an emulsion, and more specifically, an oil in water (O/W) type emulsion.

The treatment liquid according to the first embodiment is preferably used, for example, in an ink-jet textile printing apparatus and an ink-jet textile printing method described below. The treatment liquid according to the first embodiment is, for example, a treatment liquid for post-treatment. Specifically, after an image is formed, by ink, in an image formation area of a textile print object, the image formation area is post-processed with the treatment liquid according to the first embodiment.

<Emulsified Particles>

The emulsified particles contained in the treatment liquid contain silicone oil. Silicone oil contains at least an ionic group-containing silicone oil. The silicone oil may further contain other silicone oil (hereinafter, may be referred to as other silicone oil), in addition to the ionic group-containing silicone oil. The emulsified particles, by containing silicone oil, especially the ionic group-containing silicone oil, can obtain the following first to fourth advantages.

The first advantage will be explained. Silicone oil has a friction-reducing effect. When the textile print object is post-treated with the treatment liquid, the image formed on the textile print object is coated with silicone oil, and the friction coefficient of the surface of the textile print object is reduced. As a result, even when the image formed on the textile print object is rubbed, discoloration is unlikely to occur, and a textile printed matter having excellent dry frictional fastness and wet frictional fastness can be formed. Further, by being coated with silicone oil which has the friction-reducing effect, the yarns as textile print objects will have reduced friction therebetween. As a result, the stiffness, of the textile print object, caused by the image formation is reduced, and the deterioration of the tactile sensation of the textile printed matter is suppressed.

The second advantage will be explained. Silicone oil has water repellency. By being post-processed with the treatment liquid, the textile print object is coated with the water-repellent silicone oil, and the surface of the textile print object is given water repellency. As a result, even when the image formed on the textile print object is rubbed in a wet state, discoloration is unlikely to occur, and a textile printed matter having excellent wet frictional fastness can be formed.

The third advantage will be explained. It is presumed that the ionic group-containing silicone oil, by having the ionic group, forms an ionic bond between the ionic group and the textile print object and between the ionic group and the ink discharged on the textile print object. The formation of the ionic bond makes it difficult for water to wash away the ionic group-containing silicone oil from the textile print object and the ink. As a result, a textile printed matter having excellent wet frictional fastness can be formed.

The fourth advantage will be explained. Since the ionic group-containing silicone oil has an ionic group, the emulsified particles containing the ionic group-containing silicone oil are preferably dispersed in the aqueous medium of the treatment liquid. Such a treatment liquid can be preferably discharged from the treatment head of the ink-jet textile printing apparatus. When the treatment liquid is discharged from the treatment head, the amount of the used treatment liquid is reduced as compared with the case where the textile printed matter is immersed in the treatment liquid. For this reason, the textile print object is less likely to be stiff, and the deterioration of the tactile sensation of the textile printed matter is suppressed. Further, when the treatment liquid is discharged from the treatment head, a silicone oil having a viscosity higher as compared with the case where the ink containing silicone oil as a base oil is discharged from a record head can be used. Therefore, it is possible to form a textile printed matter with excellent frictional fastness. As described above, the first to fourth advantages have been explained.

The content rate of silicone oil in the treatment liquid is 5% by mass or more and 15% by mass or less. When the content rate of silicone oil is less than 5% by mass, the dry frictional fastness of the textile printed matter and the tactile sensation of the textile printed matter will decrease. On the other hand, when the content rate of silicone oil exceeds 15% by mass, the amount of ionic groups of ionic group-containing silicone oil increases, so that it is difficult to impart water repellency to the surface of the textile print object, and the wet frictional fastness of the textile printed matter decreases.

The content rate of silicone oil in the treatment liquid denotes the percentage of the mass of silicone oil with respect to the mass of the treatment liquid. When the emulsified particles contain two or more types of silicone oils (for example, ionic group-containing silicone oil and other silicone oil), the content rate of the silicone oil denotes the percentage of the total mass of two or more types of silicone oils with respect to the mass of the treatment liquid.

The viscosity of silicone oil is 1,000 $mm^2/s$ (i.e., $mm^2$/sec) or more. When the viscosity of the silicone oil is 1,000 $mm^2/s$ or more, it becomes difficult for the silicone oil, due to friction, to be separated from the textile printed matter, and the textile printed matter having excellent dry frictional fastness and wet frictional fastness can be formed. Further, as already described, the treatment liquid according to the first embodiment can be discharged from the treatment head of the ink-jet textile printing apparatus. When the treatment liquid is discharged from the treatment head, the amount of the used treatment liquid is reduced as compared with the case where the textile printed matter is immersed in the treatment liquid. Therefore, even when the silicone oil with a high viscosity of 1,000 $mm^2/s$ or more is used for the treatment liquid, it is difficult for the textile print object to become stiff, and the deterioration of the tactile sensation of the textile printed matter is suppressed.

The upper limit of the viscosity of silicone oil is not particularly limited. The viscosity of the silicone oil is preferably 100,000 $mm^2/s$ or less, and more preferably 6,000 $mm^2/s$ or less. The viscosity of silicone oil may be within the range of two values selected from the group consisting of, for example, 1,000 $mm^2/s$, 1,100 $mm^2/s$, 1,200 $mm^2/s$, 1,500 $mm^2/s$, 1,700 $mm^2/s$, 1,800 $mm^2/s$, 2,000 $mm^2/s$, 3,000 $mm^2/s$, 5,700 $mm^2/s$, and 6,000 $mm^2/s$.

The viscosity of silicone oil means the kinematic viscosity at 25° C. When the emulsified particles contain two or more types of silicone oils (for example, ionic group-containing silicone oil and other silicone oil), the viscosity of the silicone oils denotes the viscosity of a mixture of two or more types of silicone oils.

The viscosity of silicone oil is measured according to the method described in JIS (Japanese Industrial Standards) Z8803: 2011 (Method for measuring viscosity of liquids). For example, by extracting the silicone oil from the treatment liquid with toluene, washing, and drying, the silicone oil can be separated from the treatment liquid, and the viscosity of the silicone oil can be measured.

The average particle size (dispersed particle size in an aqueous medium) of the emulsified particles is preferably 100 nm or more and 250 nm or less, more preferably 120 nm or more and 220 nm or less, and further preferably 150 nm or more and 200 nm or less. When the average particle size of the emulsified particles is within such a range, the treatment liquid containing the emulsified particles can be preferably discharged from the treatment head of the ink-jet textile printing apparatus. The average particle size of the emulsified particles may be in the range of two values selected from the group consisting of, for example, 100 nm, 120 nm, 135 nm, 150 nm, 155 nm, 160 nm, 180 nm, 200 nm, 210 nm, 220 nm, and 250 nm.

The average particle size of the emulsified particles means the harmonic mean particle size (also called cumulant average particle size) which is calculated based on the cumulant method, and is based on the scattered light intensity standards. The average particle size of the emulsified particles is measured according to the method described in ISO13321: 1996 (Particle size analysis-Photon correlation spectroscopy).

The emulsified particles may further contain components other than silicone oil. However, it is preferable that the emulsified particles contain only silicone oil in order to form a textile printed matter having excellent frictional fastness and suppress deterioration of the tactile sensation of the textile printed matter.

As already mentioned, the silicone oil contained in the emulsified particles may contain at least an ionic group-containing silicone oil, and may further contain other silicone oil. The ionic group-containing silicone oil and other silicone oil will be described below.

(Ionic Group-Containing Silicone Oil)

The ionic group-containing silicone oil is, for example, a modified silicone oil, and more specifically, an ionic group-modified silicone oil. Examples of the ionic group-modified silicone oil include a modified silicone oil having an ionic group introduced in the side chain, and a modified silicone oil having an ionic group introduced into the terminal group.

The modified silicone oil where an ionic group is introduced into a side chain has a first terminal group represented by a Formula (1a), a repeating unit represented by a Formula (1b), a repeating unit represented by a Formula (1c), and a second terminal group represented by a Formula (1d).

[Chemical 1]

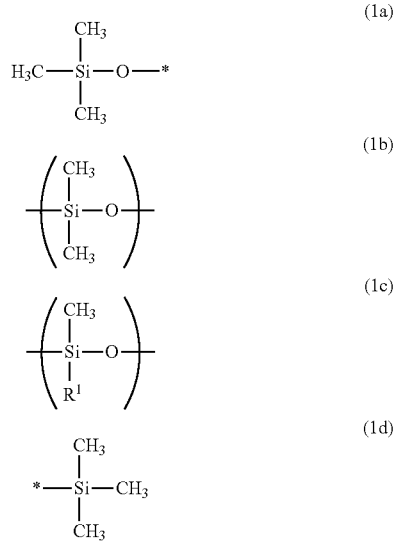

\* in the Formula (1a) denotes a bond hand that bonds to a silicon atom in the repeating unit represented by the Formula (1b) or (1c). \* in the Formula (1d) denotes a bond hand that bonds to an oxygen atom in the repeating unit represented by the Formula (1b) or (1c). $R^1$ in the Formula (1c) represents a group containing an ionic group. As an ionic group of the group containing an ionic group, an amino group, a carboxy group, a phenolic hydroxyl group, or a silanol group is preferable.

The modified silicone oil where an ionic group is introduced into the terminal group has a first terminal group represented by a Formula (2a), a repeating unit represented by a Formula (2b), and a second terminal group represented by a Formula (2c), which are shown below.

[Chemical 2]

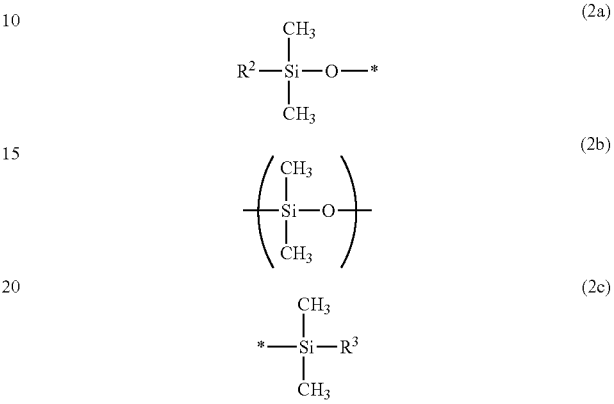

\* in the Formula (2a) denotes a bond hand that bonds to a silicon atom in the repeating unit represented by the Formula (2b). \* in the Formula (2c) denotes a bond hand that bonds to an oxygen atom in the repeating unit represented by the Formula (2b). $R^2$ in the Formula (2a) and $R^3$ in the Formula (2c) each independently represent a group containing an ionic group. As an ionic group of the group containing an ionic group, an amino group, a carboxy group, a phenolic hydroxyl group, or a silanol group is preferable.

The ionic group-containing silicone oil is preferably at least one type selected from the group consisting of an amino-modified silicone oil, a carboxy-modified silicone oil, a phenol-modified silicone oil, and a silanol-modified silicone oil, and more preferably one type Amino-modified silicone oil, carboxy-modified silicone oil, phenol-modified silicone oil, and silanol-modified silicone oil, respectively, have an amino group, a carboxylic group, a phenol group, and a silanol group, respectively.

In order to preferably disperse the emulsified particles in the aqueous medium, the functional group equivalent of the ionic group-containing silicone oil is preferably 1,000 g/mol or more and 5,500 g/mol or less. The functional group equivalent is the molecular weight per 1 mol of functional group (ionic group). The functional group equivalent of the ionic group-containing silicone oil may be within the range of two values selected from the group consisting of, for example, 1,000 g/mol, 1,200 g/mol, 1,474 g/mol, 1,490 g/mol, 1,500 g/mol, 2,000 g/mol, 3,800 g/mol, 3,900 g/mol, 4,000 g/mol, 5,000 g/mol, 5,200 g/mol, and 5,500 g/mol.

The content rate of the ionic group-containing silicone oil with respect to the total mass of the silicone oil contained in the emulsified particles is preferably 30% by mass or more and 100% by mass or less, and more preferably 40% by mass or more and 100% by mass or less, and particularly preferably, 100% by mass.

(Other Silicone Oil)

With the silicone oil further containing other silicone oil, the viscosity of the silicone oil can be adjusted. Examples of other silicone oil include non-modified silicone oils, and more specifically, dimethyl polysiloxane.

When the other silicone oil is contained, the content rate of the other silicone oil with respect to the total mass of the silicone oil contained in the emulsified particles is preferably 70% by mass or less, more preferably 50% by mass or more and 70% by mass or less, and still more preferably 50% by mass or more and 60% by mass or less.

When the other silicone oil is contained, the ratio of the mass of the ionic group-containing silicone oil with respect to the mass of the other silicone oil is preferably 0.5 or more and 1.0 or less, and more preferably 0.6 or more and 0.7 or less.

<Aqueous Medium>

The aqueous medium contained in the treatment liquid is a medium containing water as a main component. The aqueous medium may function as a solvent or as a dispersion medium. Specific examples of the aqueous medium include water, or a mixed solution of water and a polar solvent. Examples of polar solvents contained in aqueous medium include methanol, ethanol, isopropyl alcohol, butanol, and methyl ethyl ketone. The water content rate in the aqueous medium is preferably 90% by mass or more, and particularly preferably 100% by mass. The content rate of the aqueous medium, with respect to the mass of the treatment liquid, is preferably 50% by mass or more and 90% by mass or less, and more preferably 55% by mass or more and 70% by mass or less.

<Other Components>

The treatment liquid may contain any component other than the emulsified particles and the aqueous medium (hereinafter, may be referred to as other components), if necessary. Other components include acids, bases, polyols, and dispersants.

(Acid)

When the ionic group-containing silicone oil has an anionic group, the treatment liquid preferably contains an acid. The acid promotes ionization of the anionic group, and the emulsified particles containing the ionic group-containing silicone oil are preferably dispersed in the aqueous medium. Examples of the acid include a strong acid and a weak acid. Examples of strong acids include hydrochloric acid, paratoluensulfonic acid, and sulfuric acid. Examples of weak acids include benzoic acid and acetic acid. As the acid, a strong acid is preferable, and hydrochloric acid, paratoluensulfonic acid, or sulfuric acid is more preferable, in order to promote the ionization of the anionic group contained in the silicone oil. When the treatment liquid contains an acid, the acid content rate, with respect to the mass of the treatment liquid, is preferably 1% by mass or more and 5% by mass or less, converted to the amount of the acid having a concentration of 1 mol/L.

(Base)

When the ionic group-containing silicone oil has a cationic group, the treatment liquid preferably contains a base. The base promotes the ionization of the cationic group, and the emulsified particles containing the ionic group-containing silicone oil are preferably dispersed in the aqueous medium. Examples of the base include sodium hydroxide. When the treatment liquid contains a base, the base content rate, with respect to the mass of the treatment liquid, is preferably 1% by mass or more and 5% by mass or less, converted to the amount of the base having a concentration of 1 mol/L.

(Polyol)

With the treatment liquid containing the polyol, the viscosity of the treatment liquid is preferably adjusted. As the polyol, a diol or a triol is preferable. Examples of the diol include a glycol compound, and more specifically, ethylene glycol, propylene glycol, diethylene glycol, triethylene glycol, and tetraethylene glycol. Examples of triol include glycerin. When the treatment liquid contains a polyol, the content rate of the polyol, with respect to the mass of the treatment liquid, is preferably 10% by mass or more and 40% by mass or less, and more preferably 15% by mass or more and 35% by mass or less.

(Dispersant)

Examples of the dispersant include surfactants, resin dispersants, and polysaccharides. However, it is preferable that, with the treatment liquid not containing the dispersant, the emulsified particles are dispersed in the treatment liquid. As already mentioned, the emulsified particles containing the ionic group-containing silicone oil are preferably dispersed in the aqueous medium. Therefore, the dispersed state of the emulsified particles can be maintained even when the dispersant is not contained. Dispersants often have hydrophilic groups. With the dispersant, which has a hydrophilic group, not contained in the treatment liquid, the wet frictional fastness of the textile printed matter treated by the treatment liquid is improved.

<Manufacturing Method of Treatment Liquid>

An example of a method for manufacturing the treatment liquid will be described. With a homogenizer, silicone oil, an aqueous medium, and a component, as needed, to be added (for example, acid or base, and polyol) are mixed and emulsified. In this way, the emulsified particles containing silicone oil are dispersed in the aqueous medium to thereby obtain a treatment liquid.

In order to allow the emulsification to favorably proceed, a raw material emulsion containing emulsified particles may be manufactured in advance, and a raw material emulsion, an aqueous medium and, if necessary, a polyol may be mixed to thereby obtain a treatment liquid. The raw material emulsion contains, for example, silicone oil, a part of an aqueous medium, and, if necessary, an acid or base. In the manufacturing of the raw material emulsion, the emulsification time is, for example, 5 minutes or more and 1 hour or less. The emulsification temperature is, for example, 5° C. or higher and 40° C. or lower. The content rate of the raw material emulsion, with respect to the mass of the treatment liquid, is, for example, 15% by mass or more and 50% by mass or less.

Second Embodiment: Ink-Jet Textile Printing Apparatus

Next, an ink-jet textile printing apparatus 10 according to a second embodiment of the present invention will be described with reference to FIG. 1. For ease of understanding, FIG. 1 schematically illustrates component elements, and the dimension, number, and the like of the component elements may be appropriately changed. FIG. 1 is a side view showing a main part of the ink-jet textile printing apparatus 10 which is an example of the ink-jet textile printing apparatus according to the second embodiment. The ink-jet textile printing apparatus 10 shown in FIG. 1 is a flatbed type ink-jet textile printing apparatus.

The ink-jet textile printing apparatus 10 according to the second embodiment treats a textile print object P using the treatment liquid according to the first embodiment. Since the treatment liquid according to the first embodiment is used, for the same reason as described in the first embodiment, the ink-jet textile printing apparatus 10 can form a textile printed matter having excellent frictional fastness, and can suppress deterioration of the tactile sensation of the textile printed matter.

The ink-jet textile printing apparatus 10 shown in FIG. 1 includes a record head 1, a treatment head 2, and a mounting table 3. The record head 1 has a first record head 1a, a second record head 1b, a third record head 1c, and a fourth record head 1d.

The record head 1 discharges an ink to the image formation area of the textile print object P. The first record head 1a, the second record head 1b, the third record head 1c, and the fourth record head 1d of the record head 1 respectively discharge different colored inks (for example, yellow ink, magenta ink, cyan ink, and black ink). The record head 1 is not particularly limited, and examples thereof include a piezo type head and a thermal ink-jet type head.

The treatment head 2 discharges the treatment liquid to at least the image formation area of the textile print object P. The treatment liquid is the treatment liquid according to the first embodiment. The treatment head 2 is not particularly limited, and examples thereof include a piezo type head and a thermal ink-jet type head.

The textile print object P is mounted on the mounting table 3. The record head 1 and the treatment head 2 are arranged above the mounting table 3 so that the ink and the treatment liquid can be discharged to the textile print object P. Being driven by a motor (not shown), the mounting table 3 horizontally moves in a direction from the record head 1 toward the treatment head 2 (for example, to the left in FIG. 1). With the mounting table 3 moving horizontally, the textile print object P on the mounting table 3 is transported.

The textile print object P may be a woven fabric or a knitted fabric. Examples of the textile print object P include cotton fabric, silk fabric, linen fabric, acetate fabric, rayon fabric, nylon fabric, polyurethane fabric, and polyester fabric.

In the formation of the textile printed matter, first, the mounting table 3 on which the textile print object P is mounted horizontally moves, and the textile print object P is transported to a position facing the record head 1. The record head 1 discharges the ink to the image formation area of the textile print object P. In this way, an image is formed, by the ink, in the image forming area of the textile print object P. After the ink is discharged, the mounting table 3 on which the textile print object P is mounted moves further horizontally, and the textile print object P is transported to a position facing the treatment head 2. The treatment liquid is discharged from the treatment head 2 to at least the image formation area of the textile print object P. In this way, a treatment film is formed, by the treatment liquid, on the image formed in the image formation area of the textile print object P.

The treatment head 2 may discharge the treatment liquid only to the image formation area of the textile print object P, or may discharge the treatment liquid to an area wider than the image formation area of the textile print object P, and may discharge the treatment liquid to the entire surface of the textile print object P. In order to suppress the deterioration of the tactile sensation of the textile printed matter by reducing the amount of the used treatment liquid, it is preferable that the treatment head 2 discharges the treatment liquid only to the image formation area of the textile print object P, and it is more preferable to discharge the treatment liquid only to the area, of the image formation area, where the ink is discharged by the record head 1. Since the treatment head 2 can accurately control the position to which the treatment liquid is discharged, it is possible to discharge the treatment liquid only to the area where the ink is discharged. The distance between the treatment head 2 and the textile print object P is preferably 1 mm or more and 5 mm or less in order to accurately control the position to which the treatment liquid is discharged. Further, in order to efficiently proceed with the post-treatment with the treatment liquid, it is preferable that only the treatment liquid is discharged from the treatment head 2.

After the treatment liquid is discharged from the treatment head 2 to the textile print object P, the mounting table 3 on which the textile print object P is mounted further horizontally moves, and the textile print object P is transported to a position facing a heating portion (not shown). The heating portion, by heating the textile print object P, dries the ink and the treatment liquid. The heating temperature is, for example, 120° C. or more and 180° C. or less. The heating time is, for example, 1 minute or more and 10 minutes or less. By the heating, volatile components contained in the ink and the treatment liquid evaporate, and the fixing of the ink and treatment liquid to the textile print object P is promoted. As a result, there is formed a textile printed matter which is the textile print object P in which an image is formed by the ink and which is treated by the treatment liquid.

The above has described the ink-jet textile printing apparatus 10 according to the second embodiment. However, the ink-jet textile printing apparatus of the present invention is not limited to the above ink-jet textile printing apparatus 10, and can be changed as shown, for example, in the following modification. Regarding a first modification, the ink-jet textile printing apparatus 10 may include, instead of the treatment head 2 for discharging the treatment liquid, a spray for spraying the treatment liquid. Regarding a second modification, the treatment with the treatment liquid may be carried out by immersing the textile print object P in a tank in which the treatment liquid is tanked. In the case of immersing, the discharge amount of the treatment liquid described below in a third embodiment corresponds to the application amount of the treatment liquid. Regarding a third modification, the mounting table 3 horizontally moves in the ink-jet textile printing apparatus 10, but the record head 1 and the treatment head 2 may horizontally move while the mounting table 3 is fixed. Regarding a fourth modification, in the transport direction of the textile print object P, the mounting table 3 horizontally moves, or the record head 1 and the treatment head 2 horizontally move, and in the direction perpendicular to the transport direction of the textile print object P, the record head 1 and the treatment head 2 may horizontally move. Regarding a fifth modification, the number of record heads 1 may be 1 to 3 or 5 or more. Regarding a sixth modification, it may be a non-flatbed type ink-jet textile printing apparatus. As long as the record head 1 and the treatment head 2 are provided, the effect of using the treatment liquid according to the first embodiment can be obtained regardless of the mode of the ink-jet textile printing apparatus.

Third Embodiment: Ink-Jet Textile Printing Method

Next, continuously referring to FIG. 1, the ink-jet textile printing method according to a third embodiment of the present invention will be described. In the ink-jet textile printing method according to the third embodiment, an image is formed in the image formation area of the textile print object P by using the treatment liquid according to the first embodiment. Further, in the ink-jet textile printing method according to the third embodiment, the image is formed in the image formation area of the textile print object P by using the ink-jet textile printing apparatus 10 according to the second embodiment. Since the ink-jet textile printing method according to the third embodiment uses the treatment liquid according to the first embodiment, it is possible, for the same reason as described in the first embodiment, to form a textile printed matter having excellent frictional fastness, and to suppress the deterioration of the tactile sensation of the textile printed matter.

The ink-jet textile printing method according to the third embodiment includes an ink discharging process and a treating process. In the ink discharging process, the ink is discharged from the record head 1 to the image forming area of the textile print object P. In the treating process, the treatment liquid is discharged from the treatment head 2 to at least the image formation area of the textile print object P. The treatment liquid is the treatment liquid according to the first embodiment. The treating process is performed, for example, after the ink discharging process. If necessary, the ink-jet textile printing method may further contain a heating process.

In the ink discharging process, the discharge amount of ink to the textile print object P is, for example, 5 g/m² or more and 40 g/m² or less.

In the treating process, the discharge amount of the treatment liquid to the textile print object P is, for example, 10 g/m² or more and 120 g/m² or less. In order to particularly improve the dry frictional fastness, the discharge amount of the treatment liquid is preferably 15 g/m² or more and 30 g/m² or less. In order to particularly improve the wet frictional fastness in addition to the dry frictional fastness, it is more preferable that the discharge amount of the treatment liquid is 17 g/m² or more and 25 g/m² or less. With reference to FIG. 1, the ink-jet textile printing method according to the third embodiment has been described above.

Ink Used in the Second and Third Embodiments

Next, the ink used in the second embodiment and the third embodiment will be described. The ink contains, for example, a pigment and an aqueous medium. The ink may further contain at least one type selected from the group consisting of surfactants, polyols, and binder resin particles, if necessary.

(Pigment)

Pigments are dispersed, for example, in an aqueous medium and present. From the viewpoint of obtaining an ink having excellent image density, hue, and color stability, the $D_{50}$ of the pigment is preferably 30 nm or more and 250 nm or less, and more preferably 70 nm or more and 160 nm or less.

Examples of pigments include yellow pigments, orange pigments, red pigments, blue pigments, purple pigments, and black pigments. Examples of yellow pigments include C. I. pigments yellow (74, 93, 95, 109, 110, 120, 128, 138, 139, 151, 154, 155, 173, 180, 185, and 193). Examples of orange pigments include C. I. pigments orange (34, 36, 43, 61, 63, and 71). Examples of red pigments include C. I. pigments red (122 and 202). Examples of blue pigments include C. I. pigments blue (15, more specifically 15:3). Examples of purple pigments include C. I. pigments violet (19, 23, and 33). Examples of the black pigment include C. I. pigment black (7).

The content rate of the pigment, with respect to the mass of the ink, is preferably 1% by mass or more and 12% by mass or less, and more preferably 1% by mass or more and 7% by mass or less. When the content rate of pigment is 1% by mass or more, the image density of the textile printed matter to be formed can be improved. Further, when the content rate of pigment is 12% by mass or less, highly fluid ink can be obtained.

(Aqueous Medium)

The aqueous medium contained in the ink is synonymous with the aqueous medium contained in the treatment liquid described in the first embodiment. The content rate of the aqueous medium, with respect to the mass of the ink, is preferably 5% by mass or more and 70% by mass or less, and more preferably 40% by mass or more and 60% by mass or less.

(Surfactant)

The ink, by containing a surfactant, improves the wettability, of the ink, to the textile print object. Examples of the surfactant include an anionic surfactant, a cationic surfactant, a nonionic surfactant, and an amphoteric surfactant. The surfactant contained in the ink is preferably a nonionic surfactant. The nonionic surfactant is preferably a surfactant having an acetylene glycol structure, and more preferably an acetylene diol ethylene oxide adduct. The HLB value of the surfactant is preferably 3 or more and 20 or less, more preferably 6 or more and 16 or less, and further preferably 7 or more and 10 or less. The HLB value of a surfactant is calculated from the formula "HLB value=20×(sum of the formula weights of hydrophilic parts)/molecular weight" by, for example, the Griffin method. In order to improve the image density while suppressing the image offset, the content rate of the surfactant, with respect to the mass of the ink, is preferably 0.1% by mass or more and 5.0% by mass or less, and more preferably 0.5% by mass or more and 2.0 by mass or less.

(Polyol)

The ink, by containing polyol, preferably adjusts the viscosity of the ink. The polyol contained in the ink is synonymous with the polyol contained in the treatment liquid described in the first embodiment. When the ink contains polyol, the content rate of the polyol, with respect to the mass of the ink, is preferably 5% by mass or more and 60% by mass or less, more preferably 20% by mass or more and 50% by mass or less, in order to appropriately adjust the viscosity of the ink.

(Binder Resin Particles)

The binder resin particles exist in a state of being dispersed in the aqueous medium. The binder resin particles function as a binder that binds the textile print object with the pigment. Therefore, the ink, by containing binder resin particles, can obtain a textile printed matter having excellent pigment fixability.

Examples of resins contained in the binder resin particles include urethane resin, (metha) acrylic resin, styrene-(metha) acrylic resin, styrene-maleic acid copolymer, vinyl naphthalene-(metha)acrylic acid copolymer, and vinyl naphthalene-maleic acid copolymer. The urethane resin is preferable as the resin contained in the binder resin particles. The content rate of urethane resin in the binder resin particles is preferably 80% by mass or more, and more preferably 100% by mass.

The content rate of the binder resin, with respect to the mass of the ink, is preferably 1% by mass or more and 20% by mass or less, and more preferably 2% by mass or more and 10% by mass or less. When the content rate of the binder resin particles is 1% by mass or more, it is possible to obtain a textile print object having excellent pigment fixability. On the other hand, when the content rate of the binder resin particles is 20% by mass or less, the ink can be stably discharged to the textile print object.

(Additive)

The ink may further contain known additives (more specifically, dissolution stabilizers, anti-drying agents, antioxidants, viscosity regulators, pH regulators, fungicides, etc.), if necessary.

(Ink Manufacturing Method)

Inks are manufactured, for example, by using a stirrer to mix the pigment, the aqueous medium, and the components, as needed, added (e.g., surfactants, polyol, and binder resin particles). The mixing time is, for example, 1 minute or more and 30 minutes or less.

EXAMPLES

Examples of the present invention will be described below. However, the present invention is not limited to the following examples.

Preparation of Treatment Liquid

Treatment liquids (A-1) to (A-7) and (B-1) to (B-5) were prepared by the following methods. The compositions of the treatment liquids (A-1) to (A-7) and (B-1) to (B-5) are shown in Table 1.

TABLE 1

| TREAT-MENT LIQUID | RAW MATERIAL EMULSION | SILICONE OIL | | |
|---|---|---|---|---|
| | | AMOUNT (wt %) | MODIFICATION | VISCOSITY [mm$^2$/s] |
| A-1 | A | 10 | AMINO | 1,700 |
| A-2 | A | 5 | AMINO | 1,700 |
| A-3 | A | 15 | AMINO | 1,700 |
| A-4 | B | 10 | CARBOXY | 2,000 |
| A-5 | C | 10 | AMINO | 5,700 |
| A-6 | D | 10 | PHENOL | 1,000 |
| A-7 | E | 10 | SILANOL | 1,200 |
| B-1 | A | 3 | AMINO | 1,700 |
| B-2 | A | 20 | AMINO | 1,700 |
| B-3 | F | 10 | AMINO | 110 |
| B-4 | G | — | NON-MODIFIED | 3,000 |
| B-5 | H | 10 | POLYETHER | 1,600 |

The meanings of respective terms in Table 1 are as follows. "Amount" denotes the content rate of silicone oil in the treatment liquid. When the emulsified particles contain two or more types of silicone oils, the "amount" denotes the total content rate of two or more types of silicone oils in the treatment liquid. "Wt %" denotes mass %. "Viscosity" denotes the viscosity of silicone oil. When the emulsified particles contain two or more types of silicone oils, "viscosity" denotes the viscosity of a mixture of two or more types of silicone oils. "-" denotes that the raw material emulsion G could not be prepared and the treatment liquid (B-4) could not be prepared.

First, the raw material emulsions A to H for use in the preparation of respective treatment liquids were prepared by the methods shown below.

<Preparation of Raw Material Emulsion A>

300 g of amino-modified silicone oil ("KF-864" made by Shin-Etsu Chemical Co., Ltd., viscosity: 1,700 mm$^2$/s, specific gravity: 0.98, functional group equivalent: 3,800 g/mol), 600 g of ion-exchange water, and 100 g of hydrochloric acid (Concentration: 1 mol/L) were put in a beaker. Using a homogenizer (IKA's "Ultratalax T25"), the contents of the beaker were stirred at a rotation speed of 10,000 rpm for 15 minutes and allowed to stand still for 30 minutes. Next, the contents of the beaker were filtered with a 120-mesh stainless steel filter, thus obtaining a raw material emulsion A. Emulsified particles of amino-modified silicone oil were dispersed in the raw material emulsion A. The average particle size of the emulsified particles contained in the raw material emulsion A was 150 nm.

<Preparation of Raw Material Emulsion B>

300 g of carboxy-modified silicone oil ("X-22-3701E" made by Shin-Etsu Chemical Co., Ltd., viscosity: 2,000 mm$^2$/s, specific gravity: 0.98, functional group equivalent: 4,000 g/mol), 600 g of ion-exchange water, and 100 g of sodium hydroxide aqueous solution (concentration: 1 mol/L) were put in a beaker. Using a homogenizer (IKA's "Ultratalax T25"), the contents of the beaker were stirred at a rotation speed of 10,000 rpm for 15 minutes and allowed to stand still for 30 minutes. Next, the contents of the beaker were filtered with a 120-mesh stainless steel filter, thus obtaining a raw material emulsion B. Emulsified particles of carboxy-modified silicone oil were dispersed in the raw material emulsion B. The average particle size of the emulsified particles contained in the raw material emulsion B was 120 nm.

<Preparation of Raw Material Emulsion C>

300 g of amino-modified silicone oil ("KF-877" made by Shin-Etsu Chemical Co., Ltd., viscosity: 5,700 mm$^2$/s, specific gravity: 0.98, functional group equivalent: 5,200 g/mol), 600 g of ion-exchange water, and 100 g of hydrochloric acid (Concentration: 1 mol/L) were put in a beaker. Using a homogenizer (IKA's "Ultratalax T25"), the contents of the beaker were stirred at a rotation speed of 10,000 rpm for 15 minutes and allowed to stand still for 30 minutes. Then, the contents of the beaker were filtered with a 120 mesh stainless steel filter, thus obtaining a raw material emulsion C. Emulsified particles of amino-modified silicone oil were dispersed in the raw material emulsion C. The average particle size of the emulsified particles contained in the raw material emulsion C was 200 nm.

<Preparation of Raw Material Emulsion D>

180 g of non-modified silicone oil ("KF96-3000cs" made by Shin-Etsu Chemical Co., Ltd., viscosity: 3,000 mm$^2$/s, specific gravity: 0.97), and 120 g of phenol-modified silicone oil ("KF2201" made by Shin-Etsu Chemical Co., Ltd., viscosity: 97 m$^2$/s, specific gravity: 0.99, functional group equivalent: 1,474 g/mol) were mixed to thereby obtain a mixture MD with a viscosity of 1,000 mm$^2$/s. 300 g of mixture MD, 600 g of ion-exchange water, and 100 g of sodium hydroxide aqueous solution (concentration: 1 mol/L) were put in a beaker. Using a homogenizer (IKA's "Ultratalax T25"), the contents of the beaker were stirred at a rotation speed of 10,000 rpm for 15 minutes and allowed to stand still for 30 minutes. Next, the contents of the beaker were filtered with a 120-mesh stainless steel filter, thus obtaining a raw material emulsion D. Emulsified particles containing non-modified silicone oil and phenol-modified silicone oil were dispersed in the raw material emulsion D. The average particle size of the emulsified particles contained in the raw material emulsion D was 160 nm.

<Preparation of Raw Material Emulsion E>

180 g of non-modified silicone oil ("KF96-3000cs" made by Shin-Etsu Chemical Co., Ltd., viscosity: 3,000 mm$^2$/s, specific gravity: 0.97), and 120 g of silanol-modified silicone oil ("KF9701" made by Shin-Etsu Chemical Co., Ltd., viscosity: 60 mm$^2$/s, specific gravity: 0.977, functional group equivalent: 1,500 g/mol) were mixed to thereby obtain a mixture ME with a viscosity of 1,200 mm$^2$/s. 300 g of mixture ME, 600 g of ion-exchange water, and 100 g of sodium hydroxide aqueous solution (concentration: 1 mol/L) were put in a beaker. Using a homogenizer (IKA's "Ultratalax T25"), the contents of the beaker were stirred at a rotation speed of 10,000 rpm for 15 minutes and allowed to stand still for 30 minutes. Next, the contents of the beaker were filtered with a 120-mesh stainless steel filter, thus obtaining a raw material emulsion E. Emulsified particles containing non-modified silicone oil and silanol-modified silicone oil were dispersed in the raw material emulsion E. The average particle size of the emulsified particles contained in the raw material emulsion E was 220 nm.

<Preparation of Raw Material Emulsion F>

300 g of amino-modified silicone oil ("KF-865" made by Shin-Etsu Chemical Co., Ltd., viscosity: 110 mm$^2$/s, specific gravity: 0.97, functional group equivalent: 5,000 g/mol), 600 g of ion-exchange water, and 100 g of hydrochloric acid (concentration: 1 mol/L) were put in a beaker. Using a homogenizer (IKA's "Ultratalax T25"), the contents of the beaker were stirred at a rotation speed of 10,000 rpm for 15 minutes and allowed to stand still for 30 minutes. Next, the contents of the beaker were filtered with a 120-mesh stainless steel filter, thus obtaining a raw material emulsion F. Emulsified particles of amino-modified silicone oil were dispersed in the raw material emulsion F. The average particle size of the emulsified particles contained in the raw material emulsion F was 150 nm.

<Attempts to Prepare Raw Material Emulsion G>

300 g of non-modified silicone oil ("KF-96-3000cs" made by Shin-Etsu Chemical Co., Ltd., viscosity: 3,000 mm$^2$/s, specific gravity: 0.97), 600 g of ion-exchange water, and 100 g of hydrochloric acid (concentration: 1 mol/L) were put in a beaker. Using a homogenizer ("Ultratalax T25" made by IKA), the contents of the beaker were stirred at a rotation speed of 10,000 rpm for 15 minutes. Then, merely emulsified particles with an average particle diameter of 1 μm or more could be prepared. Further, after the stirring, the contents of the beaker were allowed to stand still for 30 minutes. Then, the aqueous phase and the oil phase were separated, and the raw material emulsion G could not be prepared.

<Preparation of Raw Material Emulsion H>

300 g of polyether-modified silicone oil ("KF-352A" made by Shin-Etsu Chemical Co., Ltd., viscosity: 1,600 mm$^2$/s, specific gravity: 1.03), and 700 g of ion-exchange water were put in a beaker. Using a homogenizer (IKA's "Ultratalax T25"), the contents of the beaker were stirred at a rotation speed of 10,000 rpm for 15 minutes and allowed to stand still for 30 minutes. Next, the contents of the beaker were filtered with a 120-mesh stainless steel filter, thus obtaining a raw material emulsion H. Emulsified particles of polyether-modified silicone oil were dispersed in the raw material emulsion H. Note that the polyether-modified silicone oil does not have an ionic group. The average particle size of the emulsified particles contained in the raw material emulsion H was 150 nm.

Next, using the prepared raw material emulsions A to H, the treatment liquids (A-1) to (A-7) and (B-1) to (B-5) were prepared by the methods shown below. The content rate of silicone oil was calculated by rounding off the first decimal place.

<Preparation of Treatment Liquid (A-1)>

33.30 g of raw material emulsion A (content rate of amino-modified silicone oil: 30% by mass, content amount of amino-modified silicone oil: 9.99 g), 33.35 g of ion-exchange water, and 33.35 g of propylene glycol were mixed, thus obtaining a treatment liquid (A-1). In the treatment liquid (A-1), the content rate of amino-modified silicone oil was 10% by mass.

<Preparation of Treatment Liquid (A-2)>

15.00 g of raw material emulsion A (content rate of amino-modified silicone oil: 30% by mass, content amount of amino-modified silicone oil: 4.50 g), 50.00 g of ion-exchange water, and 35.00 g of propylene glycol were mixed, thus obtaining a treatment liquid (A-2). In the treatment liquid (A-2), the content rate of amino-modified silicone oil was 5% by mass.

<Preparation of Treatment Liquid (A-3)>

50.00 g of raw material emulsion A (content rate of amino-modified silicone oil: 30% by mass, content amount of amino-modified silicone oil: 15.00 g), 35.00 g of ion-exchange water, and 15.00 g of propylene glycol were mixed, thus obtaining a treatment liquid (A-3). In the treatment liquid (A-3), the content rate of amino-modified silicone oil was 15% by mass.

<Preparation of Treatment Liquid (A-4)>

A treatment liquid (A-4) was obtained by the method same as the method for the treatment liquid (A-1), except that the raw material emulsion A (content rate of amino-modified silicone oil: 30% by mass) was changed to the raw material emulsion B (content rate of carboxy-modified silicone oil: 30% by mass). In the treatment liquid (A-4), the content rate of the carboxy-modified silicone oil was 10% by mass.

<Preparation of Treatment Liquid (A-5)>

A treatment liquid (A-5) was obtained by the method same as the method for the treatment liquid (A-1), except that the raw material emulsion A (content rate of amino-modified silicone oil: 30% by mass) was changed to the raw material emulsion C (content rate of amino-modified silicone oil: 30% by mass). In the treatment liquid (A-5), the content rate of amino-modified silicone oil was 10% by mass.

<Preparation of Treatment Liquid (A-6)>

The treatment liquid (A-6) was obtained by the method same as the method for the treatment liquid (A-1), except that the raw material emulsion A (content rate of amino-modified silicone oil: 30% by mass) was changed to the raw material emulsion D (content rate of the mixture of phenol-modified silicone oil and non-modified silicone oil: 30% by mass). In the treatment liquid (A-6), the content rate of the mixture of phenol-modified silicone oil and non-modified silicone oil was 10% by mass.

<Preparation of Treatment Liquid (A-7)>

The treatment liquid (A-7) was obtained by the method same as the method for the treatment liquid (A-1), except that the raw material emulsion A (content rate of amino-modified silicone oil: 30% by mass) was changed to the raw material emulsion E (content rate of mixture of silanol-modified silicone oil and non-modified silicone oil: 30% by mass). In the treatment liquid (A-7), the content rate of the mixture of silanol-modified silicone oil and non-modified silicone oil was 10% by mass.

<Preparation of Treatment Liquid (B-1)>

10.00 g of raw material emulsion A (content rate of amino-modified silicone oil: 30% by mass, content amount of amino-modified silicone oil: 3.00 g), 55.00 g of ion-exchange water, and 35.00 g of propylene glycol were mixed, thus obtaining a treatment liquid (B-1). In the treatment liquid (B-1), the content rate of amino-modified silicone oil was 3% by mass.

<Preparation of Treatment Liquid (B-2)>

65.00 g of raw material emulsion A (content rate of amino-modified silicone oil: 30% by mass, content amount of amino-modified silicone oil: 19.50 g) and 35.00 g of propylene glycol were mixed, thus obtaining a treatment liquid (B-2). In the treatment liquid (B-2), the content rate of amino-modified silicone oil was 20% by mass.

<Preparation of Treatment Liquid (B-3)>

A treatment liquid (B-3) was obtained by the method same as the method for the treatment liquid (A-1), except that the raw material emulsion A (content rate of amino-modified silicone oil: 30% by mass) was changed to the raw material emulsion F (content rate of amino-modified silicone oil: 30% by mass). In the treatment liquid (B-3), the content rate of amino-modified silicone oil was 10% by mass.

<Preparation of Treatment Liquid (B-4)>

As mentioned above, the raw material emulsion G could not be prepared, so the treatment liquid (B-4) was not prepared. Further, since the treatment liquid (B-4) was not prepared, the treatment liquid (B-4) was not evaluated.

<Preparation of Treatment Liquid (B-5)>

A treatment liquid (B-5) was obtained by the method same as the method for the treatment liquid (A-1), except that the raw material emulsion A (content rate of amino-modified silicone oil: 30% by mass) was changed to the raw material emulsion H (content rate of polyether-modified silicone oil: 30% by mass). In the treatment liquid (B-5), the content rate of the polyether-modified silicone oil was 10% by mass.

Measuring Method

<Measurement of Average Particle Size>

The average particle size of the emulsified particles was measured using a laser diffraction type particle size distribution measuring device ("Zetasizer Nano ZS" made by Malvern) according to the method described in ISO13321: 1996 (Particle size analysis-Photon correlation spectroscopy). For measurement of the average particle size of the emulsified particles, a measurement sample obtained by diluting the treatment liquid with water 1,000 times was used. The average particle size of the emulsified particles contained in the raw material emulsion and the average particle size of the emulsified particles contained in the treatment liquid are the same as each other.

<Measurement of Viscosity>

The viscosity of silicone oil was measured in an environment with a temperature of 25° C. in accordance with the method described in JIS Z8803: 2011 (Method for measuring liquid viscosity). The Ubellohde's viscometer described in "6. 2. 3 Ubellohde's viscometer" of JIS Z8803: 2011 was used to measure the viscosity of silicone oil.

Evaluation Method

<Preparation of Evaluation Ink>

Inks a and b for use in the evaluation of the treatment liquid were prepared by the method shown below.

(Preparation of Ink a)

125 g of ion-exchange water, and 2 g of nonionic surfactant ("Surfynol (registered trademark) 440" made by Nissin Chemical Industry Co., Ltd., contents: acetylenic glycol ethylene oxide adduct) were put in a 3-necked flask provided with stirring blades and having a capacity of 1 L. While stirring the contents of the flask, 165 g of propylene glycol, 100 g of black pigment dispersion liquid ("AE2078F" made by Sanyo Color Works, Ltd., contents: C. I. Pigment Black 7, solid content concentration: 20% by mass), and 108 g of binder resin particle dispersion liquid (DKS Co. Ltd. "Super Flex 470", contents: polyurethane dispersion liquid, solid content concentration: 38% by mass) was sequentially added into the flask. The contents of the flask were stirred for 10 minutes to thereby obtain an ink a.

(Preparation of Ink b)

140 g of ion-exchange water and 2 g of nonionic surfactant ("Surfynol (registered trademark) 440" made by Nissin Chemical Industry Co., Ltd., contents: acetylenic glycol ethylene oxide adduct) were put in a 3-necked flask provided with stirring blades and having a capacity of 1 L. While stirring the contents of the flask, 225 g of propylene glycol, 83 g of black pigment dispersion liquid ("AC-AK1" made by Dainichiseika Color & Chemicals Mfg. Co., Ltd., contents: C. I. Pigment Black 7, solid content concentration: 15% by mass), and 50 g of binder resin particle dispersion liquid ("Eternacoll (registered trademark) UW-1527F" made by Ube Industries, Ltd., contents: polyurethane dispersion liquid, solid content concentration: 40% by mass) were sequentially added into the flask. The contents of the flask were stirred for 10 minutes to thereby obtain an ink b.

<Preparation of Evaluation Textile Printed Matter>

An evaluation textile printed matter was prepared using the inks and treatment liquids shown in Table 2. For example, the treatment liquid (A-1) and the ink a were used for the evaluation of Example 1 in Table 2.

As the textile print object, cotton broad cloth (made by Shikisensha CO., LTD., size: A4, cotton count of warp and weft: 40/1, density of warp: 130/inch, density of weft: 75/inch, basis weight: 122 g/m$^2$) was used. For preparation of evaluation textile printed matter, an ink-jet printer ("Colorio (registered trademark) PX-045A" made by Seiko Epson Corporation) was used. A first ink chamber of a first cartridge was filled with the ink. A second ink chamber of a second cartridge was filled with the treatment liquid. The first cartridge and the second cartridge were fitted to the ink-jet printer. Further, the ink filled in the first ink chamber is discharged from a record head of the ink-jet printer. The treatment liquid filled in the second ink chamber is discharged from a treatment head of the ink-jet printer.

Using the ink-jet printer, the ink was discharged from the record head to the textile print object so that the discharge amount of ink was 20 g/m$^2$, and thereby a solid image of the ink was formed. Then, using the ink-jet printer, the treatment liquid was discharged from the treatment head to the textile print object so that the discharge amount of the treatment liquid was 20 g/m$^2$. In this way, a treatment film of the same size as the solid image was formed on the solid image of the ink by the treatment liquid. Next, the textile print object was heated at 160° C. for 3 minutes to dry the ink and the treatment liquid, thus obtaining an evaluation textile printed matter.

<Evaluation of Frictional Fastness>

According to the drying test and wetting test of the friction tester type II (Gakushin type, where "Gakushin" denotes "Japan Society for the Promotion of Science") method described in JIS L-0849: 2013 (method for testing dyeing fastness against friction), the solid image formed on the evaluation textile printed matter was rubbed by using a friction white cotton cloth. The degree of coloring of friction white cotton cloth after rubbing was evaluated, in accordance with the "Determination Criteria for Discoloration and Fading" described in Clause 10 (Determination of dyeing fastness) of JIS L-0801: 2011 (General Rules for Dyeing Fastness Test Method). The degree of coloring of the friction white cotton cloth was determined based on 9 levels (in descending order of the degree of contamination, grade 1, grades 1 to 2, grade 2, grades 2 to 3, grade 3, grades 3 to 4, grade 4, grades 4 to 5, and grade 5). The frictional fastness is better as the degree of coloring of the friction white cotton cloth is smaller (closer to 5th grade). Based on the degree of coloring of the friction white cotton cloth after the friction test, the dry frictional fastness and the wet frictional fastness were evaluated according to the following criteria. The determination result of the drying test was defined as the dry frictional fastness, and the determination result of the wet test was defined as the wet frictional fastness. When the evaluation was A and B, it was determined as accepted, and when the evaluation was C, it was determined as rejected. Table 2 shows the determined frictional fastness and its evaluation results.

(Evaluation Criteria for Dry Frictional Fastness)

Evaluation A: Dry frictional fastness falls under grade 4 or higher.

Evaluation B: Dry frictional fastness falls under grades 3 to 4.

Evaluation C: Dry frictional fastness falls under grade 3 or lower.

more, even after the textile printing, the textile print object avoids becoming hard and avoids swelling, indicating that the deterioration of the tactile sensation of the textile printed matter is suppressed. From the change rate of loop height, it was evaluated, according to the following criteria, whether or not the deterioration of the tactile sensation of the textile printed matter was suppressed. When the evaluation was A and B, it was determined as accepted, and when the evaluation was C, it was determined as rejected. Table 2 shows the evaluation results regarding the change rate of the measured loop height and the suppression of the deterioration of the tactile sensation.

(Evaluation Criteria for Suppression of Deterioration of Tactile Sensation)

Evaluation A: The change rate of loop height is 125% or less.

Evaluation B: The change rate of loop height is more than 125% and 130% or less.

Evaluation C: The change rate of loop height is over 130%.

TABLE 2

| | TREATMENT LIQUID | INK | FRICTIONAL FASTNESS | | | | TACTILE SENSATION | |
| | | | DRYNESS | | WETNESS | | HEIGHT | |
| | | | GRADE | EVALUATION | GRADE | EVALUATION | [%] | EVALUATION |
|---|---|---|---|---|---|---|---|---|
| EXAMPLE 1 | A-1 | a | 4 | A | 3 | A | 110 | A |
| EXAMPLE 2 | A-2 | a | 4 | A | 3 | A | 125 | A |
| EXAMPLE 3 | A-3 | a | 4 to 5 | A | 2 to 3 | B | 105 | A |
| EXAMPLE 4 | A-4 | a | 4 | A | 3 to 4 | A | 115 | A |
| EXAMPLE 5 | A-5 | a | 4 to 5 | A | 3 | A | 120 | A |
| EXAMPLE 6 | A-6 | a | 4 | A | 2 to 3 | B | 115 | A |
| EXAMPLE 7 | A-7 | a | 4 | A | 2 to 3 | B | 110 | A |
| EXAMPLE 8 | A-1 | b | 4 | A | 3 | A | 110 | A |
| COMPARATIVE EXAMPLE 1 | B-1 | a | 3 | C | 3 | A | 135 | C |
| COMPARATIVE EXAMPLE 2 | B-2 | a | 4 to 5 | A | 2 | C | 100 | A |
| COMPARATIVE EXAMPLE 3 | B-3 | a | 3 | C | 2 | C | 95 | A |
| COMPARATIVE EXAMPLE 4 | B-4 | a | — | — | — | — | — | — |
| COMPARATIVE EXAMPLE 5 | B-5 | a | 4 | A | 1 to 2 | C | 105 | A |

(Evaluation Criteria for Wet Frictional Fastness)

Evaluation A: Wet frictional fastness falls under grade 3 or higher.

Evaluation B: Wet frictional fastness falls under grade 2 to 3.

Evaluation C: Wet frictional fastness falls under grade 2 or lower.

<Evaluation on Suppression of Deterioration of Tactile Sensation>

An unused textile print object was folded in half along the warp (in the length direction), and the distance (loop height) between the lower fabric and the upper fabric at the crease was measured. The measured loop height of the unused textile print object was defined as the loop height before textile printing. Next, the area where the solid image of the evaluation textile printed matter was formed was folded in half along the warp (in the length direction), and the loop height was measured. The measured loop height of the evaluation textile printed matter was defined as the loop height after textile printing. The change rate of loop height (unit: %) before and after the textile printing was calculated according to the formula "Loop height change rate=100× loop height after textile printing/loop height before textile printing". The lower the change rate of the loop height is, the In Table 2 and after-described Table 3, meanings of respective terms are as follows. "Tactile sensation" denotes the evaluation on suppression of deterioration of the tactile sensation of the textile printed matter. "Height" denotes the change rate of loop height before and after the textile printing. "1-2", "2-3", "3-4" and "4-5" in the column of frictional fastness respectively denote that the degree of coloring of the friction white cotton cloth falls under grades 1 to 2, grades 2 to 3, grades 3 to 4, and grades 4 to 5. "-" denotes that the evaluation on the treatment liquid (B-4) could not be performed because, as described above, the raw material emulsion G could not be prepared and the treatment liquid (B-4) was not prepared.

<Examination of Discharge Amount of Treatment Liquid>

Next, the textile printed matter was prepared while changing the discharge amount of the treatment liquid, and the frictional fastness of the textile printed matter and the suppression of the deterioration of the tactile sensation were evaluated.

(Preparation of Textile Printed Matter Using the Treatment Liquids of Examples 1, 9, 10, 11 and 8)

Regarding the preparation of the textile printed matter using the treatment liquids of Examples 1, 9, 10, 11, and 8, the textile evaluation printed matter was prepared by the method same as the method for the above <Preparation of evaluation textile printed matter>, except that the following points were changed. The first ink chamber of the first cartridge was filled with the ink shown in Table 3, and the second ink chamber of the second cartridge was filled with the treatment liquid shown in Table 3. The discharge amount of the treatment liquid was set to the discharge amount shown in Table 3. Further, the discharge amount of ink remained unchanged at 20 g/m².

(Preparation of Textile Printed Matter Using the Treatment Liquid of Example 12)

Regarding the preparation of evaluation textile printed matter using the treatment liquid of Example 12, the textile print object on which the solid image of the ink was formed was prepared by the method same as the method for the above <Preparation of evaluation textile printed matter>, except that the following points were changed. The first ink chamber of the first cartridge was filled with the ink shown in Table 3, and the second ink chamber of the second cartridge was not filled with the treatment liquid. The discharge amount of the treatment liquid was set to 0 g/m². That is, the treatment liquid was not discharged. The discharge amount of ink remained unchanged at 20 g/m².

Next, the textile print object on which the solid image of the ink was formed was impregnated with the treatment liquid (A-1), then taken out from the treatment liquid (A-1) and lightly squeezed. Specifically, the textile print object was squeezed so that the pick-up rate was 100% and the application amount of the treatment liquid (A-1) was 120 g/m². The squeezed textile print object was heated at 160° C. for 3 minutes to dry the ink and the treatment liquid, thus obtaining an evaluation textile printed matter.

(Evaluation on Frictional Fastness and on Suppression of Deterioration of Tactile Sensation of Textile Printed Matter)

The <Evaluation of frictional fastness> and <Evaluation on suppression of deterioration of tactile sensation> above were applied to the textile printed matter prepared using the treatment liquids of Examples 1, 9, 10, 11, 12, and 8, to thereby carry out the evaluation. The evaluation results are shown in Table 3. The evaluation results for the textile printed matters prepared using the treatment liquids of Examples 1 and 8 are already shown in Table 2, but are shown again in Table 3 for ease of understanding.

containing silicone oil (more specifically, an amino-modified silicone oil, a carboxy-modified silicone oil, a phenol-modified silicone oil, or a silanol-modified silicone oil). On the other hand, the treatment liquids (B-1) to (B-5) did not have at least one of the above configurations.

As shown in Table 2, regarding the textile printed matters formed by using the treatment liquids (A-1) to (A-7), the evaluation of dry frictional fastness, the evaluation of wet frictional fastness, and the evaluation of suppression of deterioration of tactile sensation were A or B. On the other hand, as shown in Table 2, regarding the textile printed matters formed by using the treatment liquids (B-1) to (B-3) and (B-5), among the evaluation of dry frictional fastness, the evaluation of wet frictional fastness, and the evaluation of suppression of deterioration of tactile sensation, at least one evaluation was C. Also, as already mentioned, the treatment liquid (B-4) could not be prepared. Therefore, it is determined that the treatment liquids of the present invention containing the treatment liquids (A-1) to (A-7) can form a textile printed matter having excellent frictional fastness and can suppress deterioration of the tactile sensation of the textile printed matter.

Further, as shown in Table 3, regarding the textile printed matter formed using the treatment liquid (A-1) with a discharge amount or application amount of 10 g/m² or more and 120 g/m² or less, the evaluation of dry frictional fastness, the evaluation of wet frictional fastness, and the evaluation of suppression of deterioration of tactile sensation were A or B. Therefore, it is determined that, by discharging or applying the treatment liquid of the present invention at a discharge amount or application amount of 10 g/m² or more and 120 g/m² or less, a textile printed matter having excellent frictional fastness can be formed, and deterioration of tactile sensation of the textile printed matter can be suppressed.

Further, as shown in Table 3, regarding the textile printed matter formed using the treatment liquid (A-1) with a discharge amount of 15 g/m² or more and 30 g/m² or less, the evaluation of dry frictional fastness was A. Therefore, it is determined that, by discharging the treatment liquid of the present invention at a discharge amount of 15 g/m² or more and 30 g/m² or less, a textile printed matter having particularly excellent dry frictional fastness can be formed.

TABLE 3

| | TREATMENT LIQUID | | | FRICTIONAL FASTNESS | | | | TACTILE SENSATION | |
| --- | --- | --- | --- | --- | --- | --- | --- | --- | --- |
| | | DISCHARGE | | DRYNESS | | WETNESS | | HEIGHT | |
| | TYPE | RATE [g/m²] | INK | GRADE | EVALUATION | GRADE | EVALUATION | [%] | EVALUATION |
| EXAMPLE 1 | A-1 | 20 | a | 4 | A | 3 | A | 310 | A |
| EXAMPLE 9 | A-1 | 15 | a | 4 | A | 2 to 3 | B | 115 | A |
| EXAMPLE 10 | A-1 | 30 | a | 4 to 5 | A | 2 to 3 | B | 105 | A |
| EXAMPLE 11 | A-1 | 10 | a | 3 to 4 | B | 2 to 3 | B | 120 | A |
| EXAMPLE 12 | A-1 | 120 (APPLICATION AMOUNT) | a | 3 to 4 | B | 2 to 3 | B | 130 | B |
| EXAMPLE 8 | A-1 | 20 | b | 4 | A | 3 | A | 110 | A |

As shown in Table 1, the treatment liquids (A-1) to (A-7) all had the following configurations. The treatment liquid contained emulsified particles containing silicone oil, and an aqueous medium. The content rate of the silicone oil in the treatment liquid was 5% by mass or more and 15% by mass or less. The viscosity of the silicone oil was 1,000 mm²/s or more. The silicone oil contained at least an ionic group-

INDUSTRIAL APPLICABILITY

The treatment liquid, the ink-jet textile printing apparatus, and the ink-jet textile printing method according to the present invention can be used to form the textile printed matter.

DESCRIPTION OF REFERENCE NUMERALS

1: Record head
1a: First record head
1b: Second record head
1c: Third record head
1d: Fourth record head
2: Treatment head
3: Mounting table
10: Ink-jet textile printing apparatus
P: Textile print object

The invention claimed is:

1. An ink-jet treatment liquid for an image formed by an ink-jet ink, comprising:
 an emulsified particle containing a silicone oil; and
 an aqueous medium,
 wherein
 content rate of the silicone oil in the ink-jet treatment liquid is 5% by mass or more and 15% by mass or less,
 the silicone oil contains at least an ionic group-containing silicone oil, and
 a functional group equivalent of the ionic group-containing silicone oil is 1,000 g/mol or more and 5,500 g/mol or less.

2. The ink-jet treatment liquid according to claim 1, wherein the ionic group-containing silicone oil is at least one selected from the group consisting of an amino-modified silicone oil, a carboxy-modified silicone oil, a phenol-modified silicone oil, and a silanol-modified silicone oil.

3. The ink-jet treatment liquid according to claim 1, wherein viscosity of the silicone oil is 1,000 mm$^2$/s or more.

4. The ink-jet treatment liquid according to claim 1, wherein an average particle size of the emulsified particles is 100 nm or more and 250 nm or less.

5. The ink-jet treatment liquid according to claim 1, wherein the emulsified particles are dispersed without containing a dispersant.

6. An ink-jet textile printing apparatus, comprising:
 a record head that discharges an ink to an image formation area of a textile print object; and
 a treatment head that discharges a treatment liquid to at least the image formation area of the textile print object,
 wherein the ink includes a pigment particle and a binder resin particle, and
  wherein the treatment liquid is the ink-jet treatment liquid according to claim 1.

7. An ink-jet textile printing method, comprising:
 an ink discharging process that discharges an ink from a record head to an image formation area of a textile print object; and
 a treating process that discharges a treatment liquid from a treatment head to at least the image formation area of the textile print object,
 wherein the ink includes a pigment particle and a binder resin particle, and
 wherein the treatment liquid is the ink-jet treatment liquid according to claim 1.

8. The ink-jet textile printing method according to claim 7, wherein discharge amount of the treatment liquid is 15 g/m$^2$ or more and 30 g/m$^2$ or less.

9. A combination of an ink-jet ink and an ink-jet treatment liquid for an image formed by the ink-jet ink,
 wherein the ink-jet ink includes a pigment particle and a binder resin particle, and
 wherein the ink-jet treatment liquid is the ink-jet treatment liquid according to claim 1.

10. The combination according to claim 9, wherein viscosity of the silicone oil is 1,000 mm$^2$/s or more.

* * * * *